United States Patent
Klassen et al.

(10) Patent No.: US 8,068,698 B2
(45) Date of Patent: Nov. 29, 2011

(54) SYSTEM AND METHOD FOR RESIZING IMAGES PRIOR TO UPLOAD

(75) Inventors: Gerhard D. Klassen, Waterloo (CA); Terrill Dent, Waterloo (CA)

(73) Assignee: Research In Motion Limited, Waterloo (CA)

(*) Notice: Subject to any disclaimer, the term of this patent is extended or adjusted under 35 U.S.C. 154(b) by 946 days.

(21) Appl. No.: 11/754,769

(22) Filed: May 29, 2007

(65) Prior Publication Data

US 2008/0298720 A1 Dec. 4, 2008

(51) Int. Cl.
*G06K 9/32* (2006.01)
(52) U.S. Cl. ......... 382/298; 382/100; 382/305; 345/619
(58) Field of Classification Search ............... 382/298, 382/305; 345/619
See application file for complete search history.

(56) References Cited

U.S. PATENT DOCUMENTS

| | | | |
|---|---|---|---|
| 5,666,159 A * | 9/1997 | Parulski et al. | 348/211.2 |
| 7,027,084 B1 | 4/2006 | Watanabe | |
| 7,095,982 B2 * | 8/2006 | Mizutani | 455/41.2 |
| 7,362,352 B2 * | 4/2008 | Ueyama | 348/207.1 |
| 7,725,355 B2 * | 5/2010 | Mitani et al. | 705/26 |
| 7,738,735 B2 * | 6/2010 | Kotani | 382/297 |
| 2002/0037711 A1 | 3/2002 | Mizutani | |
| 2002/0051074 A1 | 5/2002 | Kawaoka et al. | |
| 2005/0246283 A1 * | 11/2005 | Gwiazda et al. | 705/52 |

FOREIGN PATENT DOCUMENTS

| | | |
|---|---|---|
| EP | 0814611 A2 | 12/1997 |
| EP | 1672902 A | 6/2006 |

* cited by examiner

*Primary Examiner* — Stephen Koziol
(74) *Attorney, Agent, or Firm* — Ridout & Maybee LLP

(57) ABSTRACT

There is disclosed a system and method for resizing an image on a handheld mobile communication device prior to uploading to an image repository. In an embodiment, the method comprises: determining the size of an original image; determining any upload size restrictions for uploading the image to the image repository; and in dependence upon the upload size restrictions, resizing the original image to a new resized image to meet the upload size restriction. In another embodiment, the method may further comprise specifying at least one user selectable image size for resizing the original image; receiving a user selection of a desired image size; and resizing the original image to the user selected desired image size. In another embodiment, the image size automatically in dependence upon image upload bandwidth.

16 Claims, 10 Drawing Sheets

SYSTEM AND METHOD FOR RESIZING IMAGES PRIOR TO UPLOAD

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to systems and methods for resizing images prior to upload.

BACKGROUND

Recent advances with handheld wireless communication devices have resulted in the introduction of integrated cameras capable of capturing images at a resolution sufficient for many consumer applications. Once captured, the images may be stored in available memory on the communication device, and viewed on a display provided on the communication device. However, the available memory on the communication device may be limited, and a user may not be able to capture and store new images in the communication device without deleting images or other files already stored in memory. As well, while the user may enjoy the images on the communication device, the user may want to share the images with other users. However, there may be carrier network restrictions on transmission bandwidth. Also, if the images are to be shared, the ability to easily add descriptive information and location information about the images may be desirable.

What is needed is an improved system and method for resizing images prior to upload.

DETAILED DESCRIPTION

As noted above, the present invention relates generally to systems and methods for resizing images prior to upload to an image repository.

Figure 1:
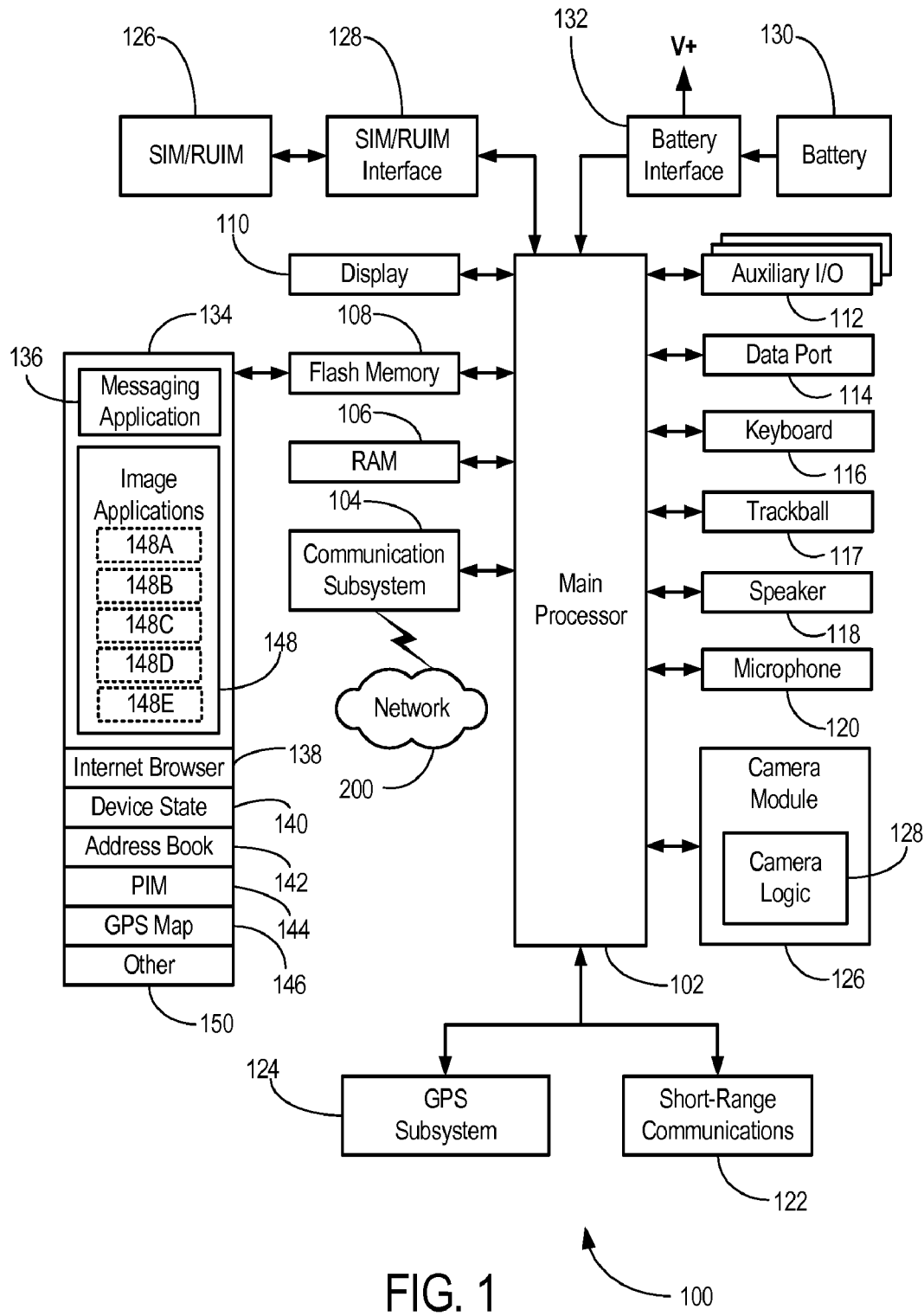
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may include a GPS antenna to receive signals transmitted by a minimum number of in-view GPS satellites required to acquire accurate latitude and longitude coordinates. The GPS system may also be operatively connected to the main processor 102 to pass the acquired latitude and longitude coordinates to one or more software applications 134, and to store the latitude and longitude coordinates as may be required into flash memory 108 or RAM 106. If the GPS antenna is not able to receive a signal from a sufficient number of in-view GPS satellites (e.g. because of buildings, bridges, or other obstructions, or because the communication device 100 is being used indoors), it may not be possible to acquire the GPS coordinates.

The camera module 126 may be adapted to capture an image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 128 to focus an image onto the CCD or CMOS sensor array. The size and pixel density of the CCD or CMOS sensor array may be suitably selected for the image resolution required for a particular application. Camera logic 128 may also control the camera lens aperture and/or shutter speed by incorporating a suitable light exposure meter. Image capture using camera module 126 may initiated by a user controlling a dedicated camera shutter, or a context dependent programmable button or key (on keyboard 116, for example) that may act as a camera shutter button.

Once captured by the CCD or CMOS sensor array, the image may then be processed by camera logic 128 into a suitable digital image file format such as Joint Photographic Experts Group (JPEG), Tagged-Image File Format (TIFF), Bit Mapping (BMP), different variations on these standard image file formats, or a vendor proprietary RAW image format. The image file format may allow for the addition of image meta-data to an image file in an industry standards exchangeable image file format (EXIF), or in some vendor proprietary meta-data format.

The image file may then be stored in available device storage such as RAM 106 or flash memory 108, and displayed on display 110. As will be described in detail further below, in order to minimize consumption of potentially scarce memory resources on communications device 100, the captured image may be transmitted from communications device 100 to an Image Repository.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100, including the camera module 126 and associated camera logic 128.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a Message List user interface that is configured to allow a user to see a list of message objects (i.e. email messages) in a convenient list form. This will be described in detail further below.

The software applications 134 may also include a GPS map application 146 for providing geographic navigation, and location coordinates for geotagging objects. GPS map application 146 may be configured to operatively connect to GPS subsystem 124 to receive GPS latitude and longitude coordinates for a current position of the communication device 100. GPS map application 146 may also store scalable maps of various geographic regions in order to show the current position of communication device 100 on the map. As well, the GPS map application 146 may be configured to obtain latitude and longitude location coordinates by allowing a user to select a position on the GPS map.

Still referring to FIG. 1, communication device 100 may execute an Image Applications Module 148 that may be operatively integrated with camera module 126, camera logic 128, main processor 102, RAM 106, display 110 and various other modules and components to provide various image application functions for the images captured by the camera module 126. Image Applications Module may include various sub modules such as an Image Upload Module 148B, an Image Resizing Module 148C, a Message Integration Module 148D, and an Image Geotagging Module 148E. These various sub modules may interact with each other, and with other application modules such as the messaging application 136, Internet browser module 138, address book module 142, GPS map module 146, etc. in order to perform various functions. Image Applications Module 148 and its sub modules will be described in more detail further below.

The communication device 100 may further include a device state module 140, an address book 142, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
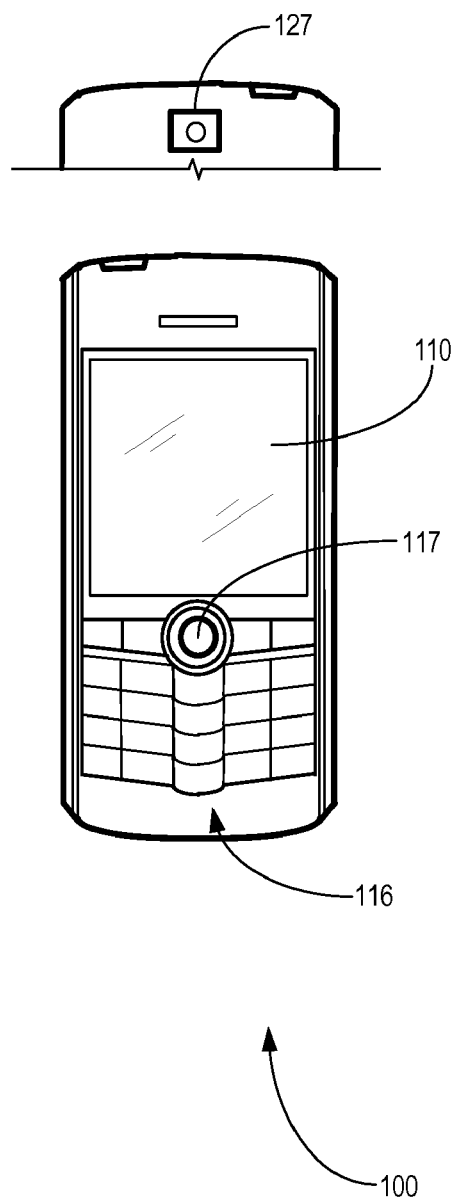
FIG. 2 is an illustrative example of a handheld mobile communication device that may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the image applications 148. Display 110 may also be configured to provide a touch-sensitive screen input in response to a prompt or query displayed on display 110. The communication device 100 may further include a camera lens that may be used to capture an image as described above with reference to FIG. 1. In an embodiment, the integrated camera 126 may provide a camera lens 127 on the back of the communication device 100, such that a user may use the display 110 as a camera viewfinder for framing an image.

Figure 3:
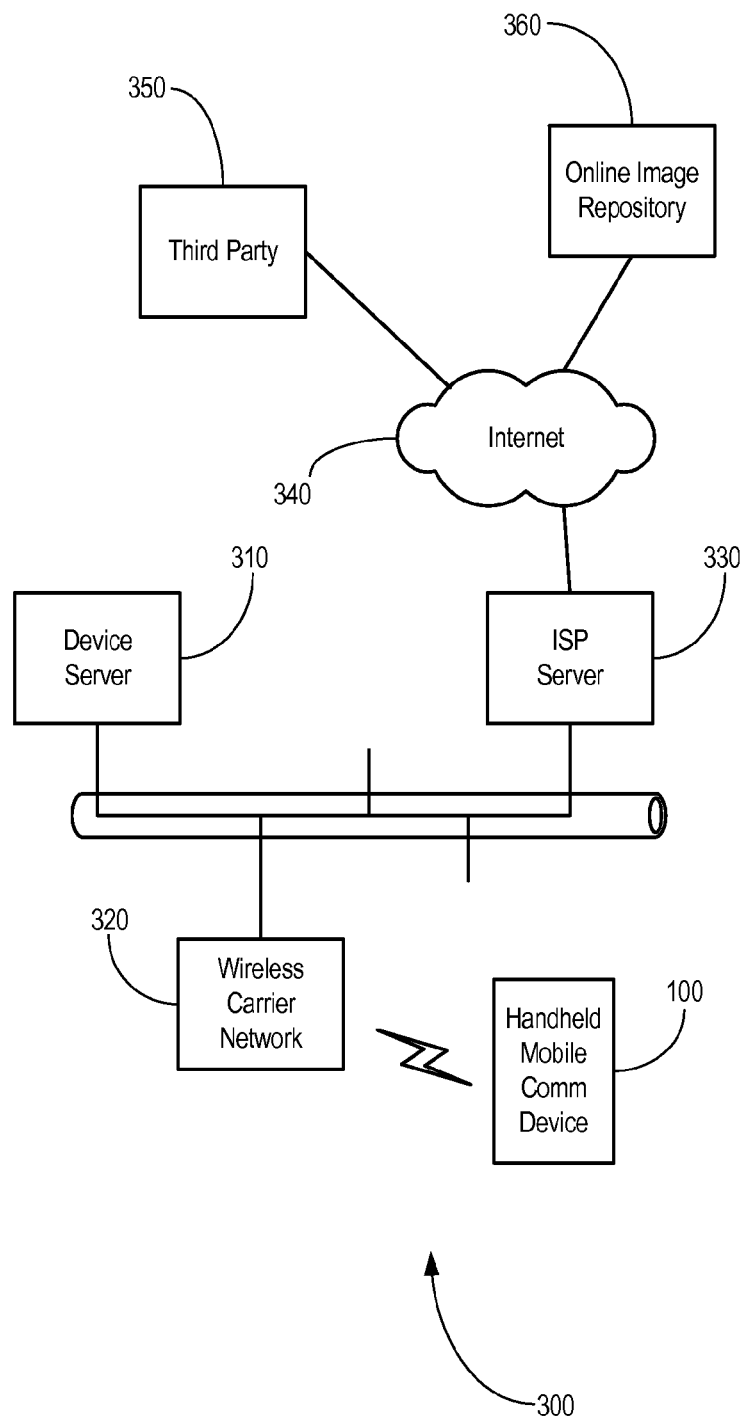
FIG. 3 is a block diagram of an illustrative example of a network environment in which various embodiments may be practiced.

Now referring to FIG. 3, shown is a schematic block diagram of an illustrative network environment 300 in which various embodiments of the invention may be practiced. As shown, network environment 300 may include a device server 310 operatively connected to the handheld mobile communication device 100 via a wireless carrier network 320. An Internet Service Provider (ISP) server 330 may also be provided in the network environment 300 such that a user of device 100 may access the Internet 340 from the device 100.

In an embodiment, the Internet 340 may provide access to an Image Repository 360. Membership to use the Image Repository 360 may be free, or may be by paid subscription, for example. The Image Repository 360 may also be accessible by a third party 350 that has membership to the Image Repository 360. As well, the Image Repository 360 may be accessed from other handheld mobile communication devices 100B within wireless carrier network 320, or from other compatible communication devices 100C with access to Internet 340.

Figure 4A:
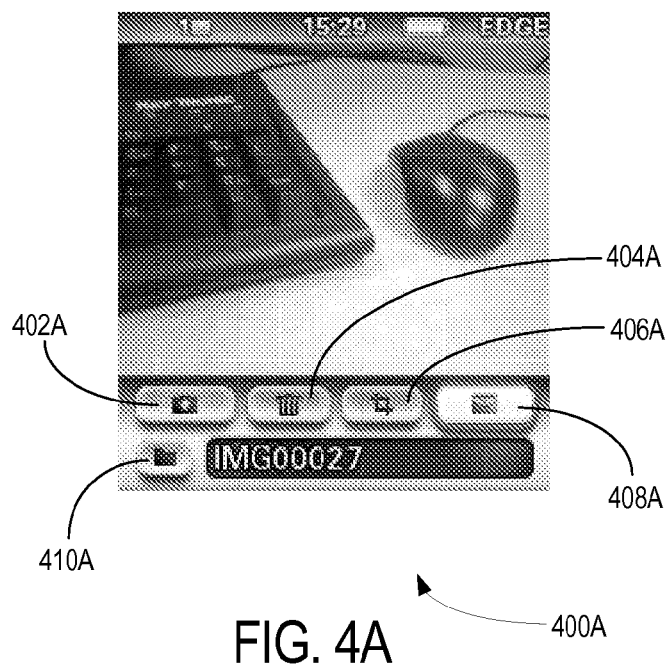
FIGS. 4A to 4K are screen captures of illustrative user interfaces in accordance with various embodiments.

Now referring to FIGS. 4A to 4K, shown are illustrative user interfaces in accordance with various embodiments. First, referring to FIG. 4A, shown is an illustrative integrated camera user interface screen 400A displaying an illustrative image "IMG00027" captured by the integrated camera (e.g. by camera module 126 and camera logic 128 as previously described). As shown, the camera user interface 400A may include icons such a "camera mode" icon 402A, a "delete image" icon 404A, a "crop image" icon 406A, a "mail image" icon 408A, and an "images folder" icon 410A.

Figure 4B:
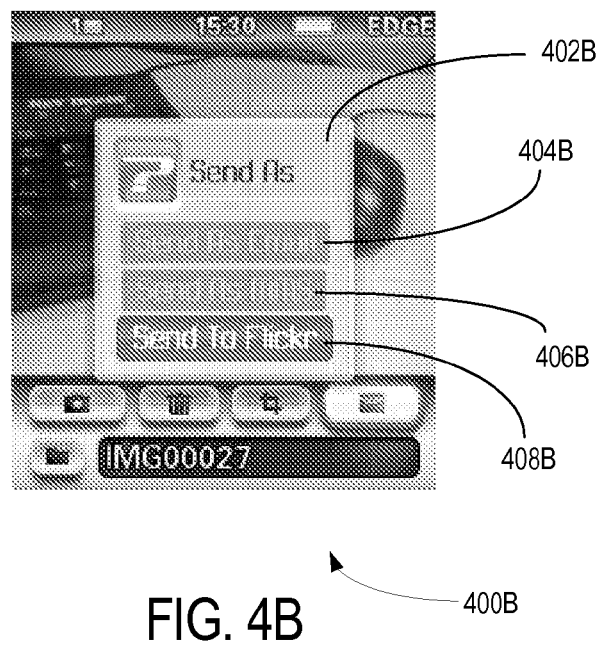

Referring to FIG. 4B, shown is a camera user interface screen 400B now including a "Send . . . " pop-up menu 402B. In this illustrative example, the "Send . . . " pop-up menu 402B includes a number of menu options including "Send as Email" 404B, "Send as MMS (Multimedia Messaging Service)" 406B, and "Send To (Image Repository)" 408B (e.g. where the Image Repository may be an online image repository such as Flickr™, for example). These "Send . . . " options will be described in more detail further below.

Figure 4C:
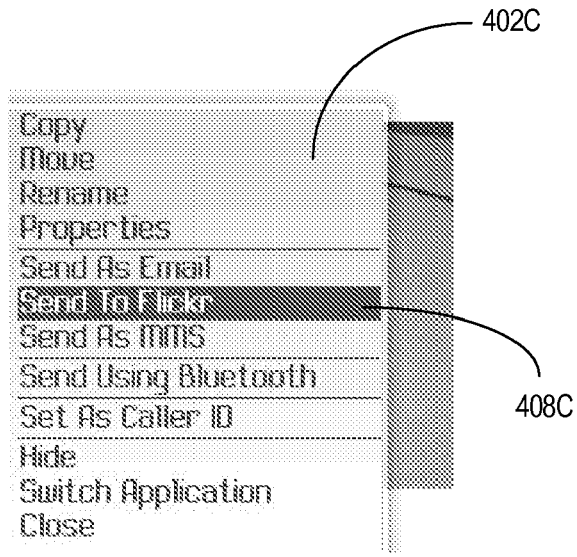

FIG. 4C shows a user interface screen 400C with a context menu 402C that may also provide the "Send . . . " menu options as described above, including "Send to (Image Repository)" 408C. This context menu 402C may be another one of several ways in which the "Send to (Image Repository)" option may be accessed, and will be discussed in more detail further below.

Figure 4D:
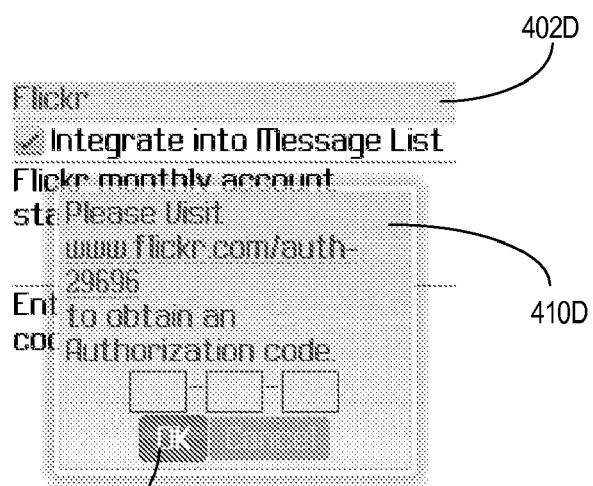

Now referring to FIG. 4D, shown is a user interface screen 400D with an option settings menu 402D for the "Send to (Image Repository)" option in which records of images uploaded to an Image Repository may be integrated into a Message List. The Message List may be a chronological listing of different types of objects that may include, for example, email messages, message status reports, telephone call records, etc. This Message List integration will be described in more detail further below.

Figure 4E:
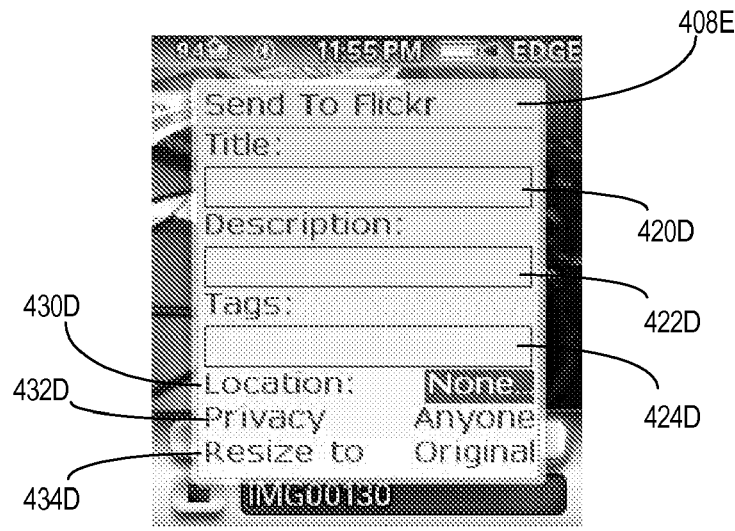

Now referring to FIG. 4E, shown is a user interface screen 400E with a "Send to (Image Repository)" window 408E in which a number of text entry fields are provided to allow the user to add descriptive information, such as "Title", "Description", and "Tags". Furthermore, the "Send to (Image Repository)" window may include various other options such as a geographic "Location" field 430D, a "Privacy" setting 432D, and an image "Resize to" setting 434D. These various settings and features will be discussed in more detail further below.

Figure 4F:
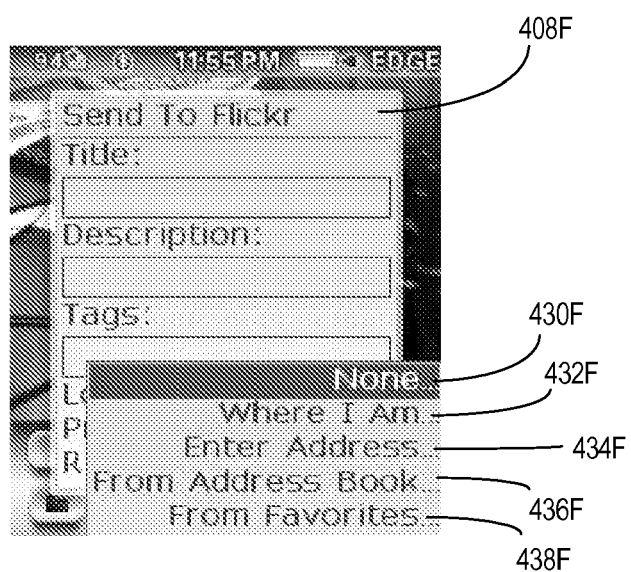

FIG. 4F shows a user interface screen 400F with an illustrative "Send to (Image Repository)" window 408F which may include various options for selecting a geographic location, such as "None" 430F, a "Where I Am . . . " option 432F, an "Enter Address . . . " option 434F, a "From Address Book . . . " option 436F, and a "Favorites" option 438F. These various options will be discussed in more detail further below.

Figure 4G:
Figure 4H:
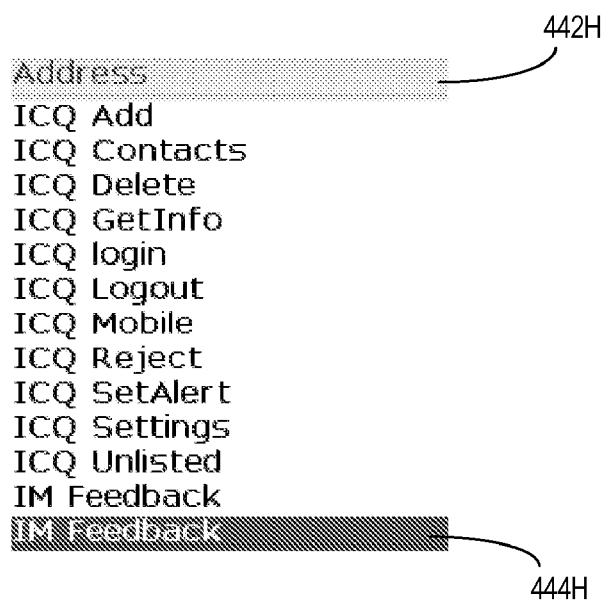

Now referring to FIG. 4G, shown is a user interface screen 400G with an illustrative "Send to (Image Repository)" screen 408G with an "Enter Address" pop-up window 440G. For example, in order to obtain geographic coordinates by address, a user may fill out one or more of the following fields: Address 442G, City 444G, State/Province 446G, and Country 448G. Alternatively, FIG. 4H shows a user interface 400H with an illustrative example of an address list 442H from which a target address 444H may be selected. With the specification of an address, or the selection of a target address from a list, the corresponding geographic coordinates may be obtained from a GPS mapping application (e.g. GPS map module 146). This feature will be described in more detail further below.

Figure 4I:
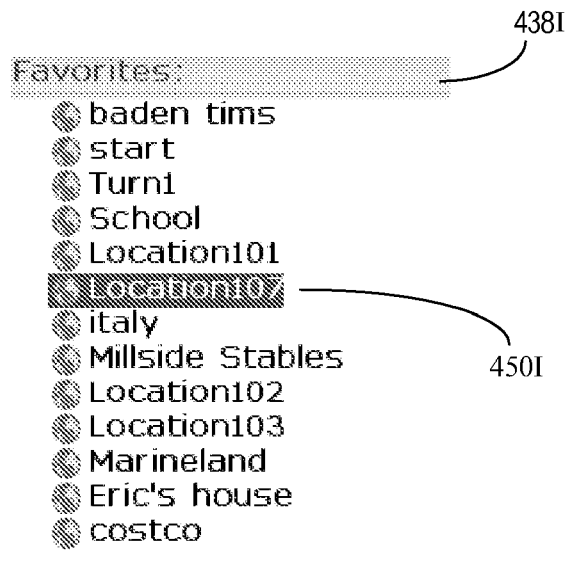

Now referring to FIG. 4I, shown is a user interface screen 400J with an illustrative list of location "Favorites" 438I from which a "favorite" location 450I may be selected for the purposes of obtaining the corresponding geographic coordinates. This feature will be described in more detail further below.

Figure 4J:
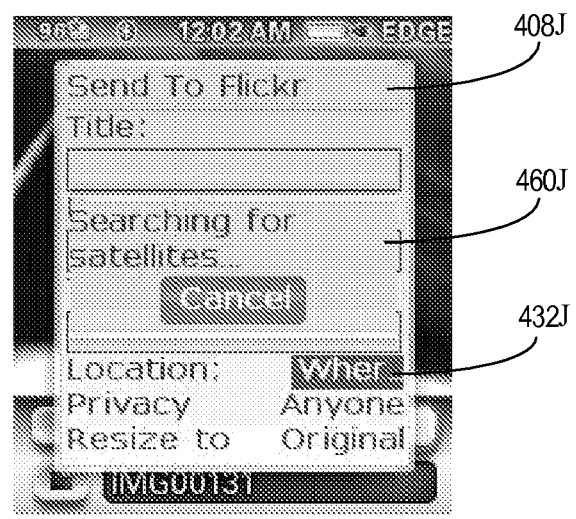

Now referring to FIG. 4J, shown is a user interface screen 400J with an illustrative "Send To (Image Repository)" screen 408J in which the "Where I Am . . . " option has been selected to obtain the geographic location. In order to determine the current location, the device 100 may search for and try to acquire GPS signals using the GPS subsystem 124, as indicated in pop-up message 460J.

Figure 4K:
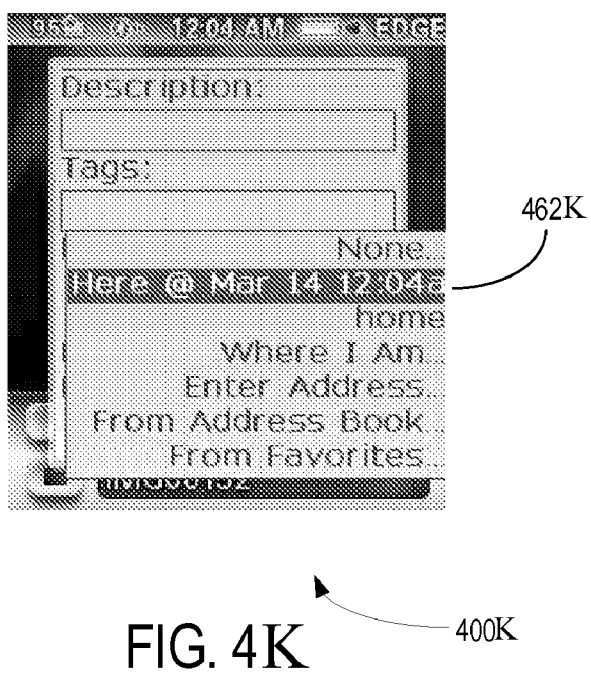

Now referring to FIG. 4K, shown is a user interface screen 400K with an illustrative geographic location menu in which a new location entry 462K (e.g. "Here @ March 14, 12:04a") has been added. The use of this geographic location acquired through the "Where I Am . . . " option will be described in more detail further below.

Now referring to FIG. 5, and referring back to FIGS. 4A to 4K as necessary, various embodiments will be described in detail.

In an embodiment, a user may resize an image on the communication device 100 prior to uploading to save bandwidth and memory space. As discussed earlier, image files captured by camera module 126 may range in size depending on the size of the CCD or CMOS sensor array, and the image resolution selected via the camera logic 128. As an illustrative example, a default image file size of a camera integrated in communication device 100 may be about 77 KB to 120 KB. With higher resolution CCD or CMOS sensor arrays, the original image file size may be significantly larger, in the order of several megabytes or more. In order to upload and share images with others, the default image may need to be resized prior to upload.

Figure 5:
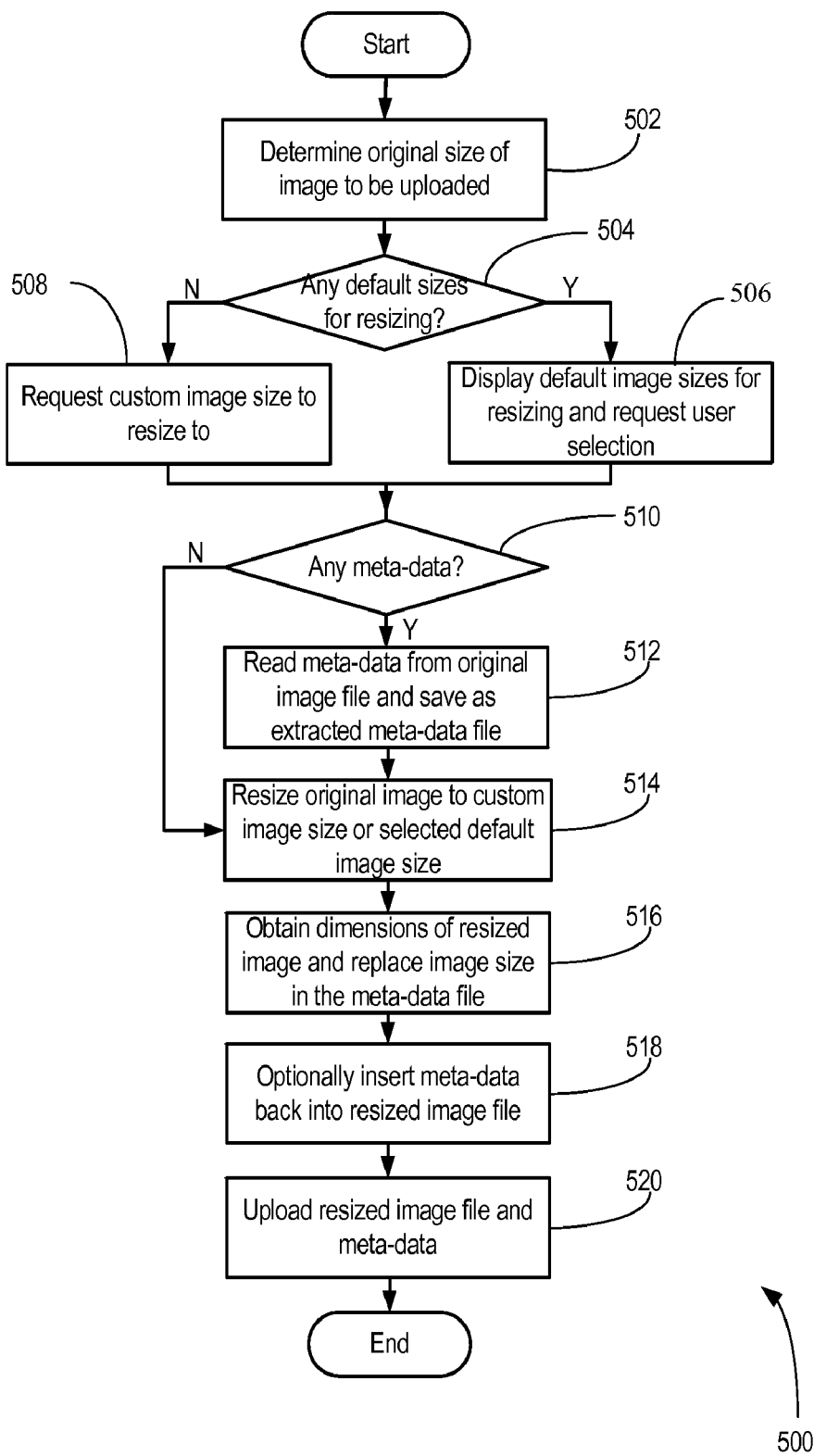
FIG. 5 is a flowchart of an illustrative method for resizing images prior to upload to an image repository in accordance with an embodiment.

FIG. 5 shows a flowchart of an illustrative method 500 for resizing images on the communication device 100 prior to upload to an Image Repository in accordance with an embodiment. As shown, method 500 begins and at block 502 determines the size of the original image to be uploaded. At decision block 504, method 500 may then determine if there are any default file sizes to which the original image may be resized.

In an embodiment, an Image Resizing Module 148C may be configured to provide a number of selectable options for image resizing, such as the following illustrative examples:

1) Original—No resizing is done to the image and the image may be uploaded at its original size. This may be the default image size, unless the user specifies that he or she would like the image to be resized.

2) Small—The image may be scaled such that the resulting image has no edge longer than 240 pixels, for example. Relative proportions of the image are maintained, such that the resizing does not elongate or flatten the image in any direction. In this illustrative example, if the original image had no edge larger than 240 pixels to begin with, then no action need be taken. This may also be the standard "small" image size on Image Repository, for example.

3) Medium—The image may be scaled such that the resulting image has no edge longer than 500 pixels, for example. Relative proportions of the image are maintained. If the original image had no edge larger than 500 pixels to begin with, then no action need be taken. This may be the standard "medium" image size on Image Repository, for example.

If yes at decision block 504, method 500 may proceed to block 506 to display the resizing options, and request that the user select one of the resizing options to use. Upon selection method 500 may proceed to decision block 510, as discussed further below. If no at decision block 504, method 500 may proceed to block 508 to request that the user enter a custom image size to resize to. For example, method 500 may request that the user provide the pixel dimensions of the longest side of the image. Method 500 may then proceed to decision block 510.

In an embodiment, image meta-data associated with an image may be preserved such that the meta-data continues to be available after resizing and uploading of the image. The meta-data may be stored in an industry standard format such as EXIF, for example, to allow a wide range of image and photo software applications to read and display the meta-data.

In an embodiment, the image meta-data may be preserved by removing the entire meta-data section of an image file prior to resizing, if it is available. This entire block of information may then be inserted into the resized image, and the resized image with the EXIF data may be made available for viewing, or upload to an Image Repository 360.

In another embodiment, the EXIF data may be updated to include the pixel dimensions of the resized image. For example, if one of the "small" or "medium" sizes specified above is selected, then the new size of the image may be used to replace the original pixel size. The updated EXIF data may then be inserted into the resized image, and the resized image may be made available for viewing, or upload to an Image Repository 360.

Thus, at decision block 510, method 500 may identify if the original image contains any meta-data (e.g. EXIF data). If yes, method 500 may proceed to block 512 where the meta-data is read from the original image file, and saved as a meta-data file separately from the original file. If no, method 500 proceeds directly to block 514.

At block 514, method 500 may proceed to resize the original image to an image of different size based on the selected default file size (e.g. small, medium), or based on a custom file size select by the user, and output a newly resized image file.

At block 516, method 500 may obtain the dimensions of the newly resized image and replace the original image size with the size of the new resized image.

At block 518, method 500 may then insert the meta-data file back into the resized image file.

At block 520, method 500 may prepare the combined, resized image file with EXIF data for upload to the Image Repository. Method 500 then ends.

In an alternative embodiment, the Image Resizing Module 148C may be configured to verify available memory on the Image Repository prior to image upload. As an illustrative example, Image Resizing Module 148C may check the amount of memory (in Kilobytes) that the user has used on their Image Repository account this month, and how much space remains in the user's monthly allotment. If the user has an Image Repository account with a specified allotment of upload usage per month (e.g. as measured in Kilobytes or Megabytes), and the user is coming close the allocated amount, the Image Resizing Module 148C may be configured to advise the user, and recommend a storage conservation mode to reduce storage usage on the Image Repository by resizing an image to be uploaded to a smaller size. If the user selects the storage conservation mode, then the Image Resizing Module 148C may be configured to default to a specified reduced size. Alternatively, the Image Resizing Module 148C may be configured to automatically select a default image size to resize to based on the available memory in the Image Repository.

In another embodiment, the Image Resizing Module 148C may be configured to respond to a running total for bandwidth usage on the wireless carrier network 320. Generally speaking, uploading images may not be a regular or scheduled event, but heavy users of the image uploading feature may be using much more bandwidth than light users or users that use the communication device 100 only for text communications. For example, if a typical user of communication device 100 uses 1 MB of data transfer per month, a heavy Image Repository user could use that much in a single day. This running total for bandwidth usage may be monitored in a bandwidth counter or meter that may be provided on communication device 100. If the user has a subscriber account on wireless carrier network with certain data upload restrictions, and the user is coming close the restricted amount, then the Image Resizing Module 148C may be configured to automatically enter a conservation mode to reduce bandwidth usage by resizing an image to be uploaded to a smaller size. Similarly, if the user selects a memory conservation mode, then the Image Resizing Module 148C may be configured to automatically default to a reduced size.

Thus, in an aspect of the invention, there is provided a method of resizing an image on a handheld mobile communication device prior to uploading to an image repository, comprising: determining the size of an original image; determining any upload size restrictions for uploading the image to the image repository; and in dependence upon the upload size restrictions, resizing the original image to a new resized image to meet the upload size restrictions.

In an embodiment, the method further comprises: specifying at least one selectable image size for resizing the original image; receiving a user selection of a desired image size; and resizing the original image to the user selected desired image size.

In another embodiment, the method further comprises selecting the image size automatically in dependence upon image upload bandwidth.

In another embodiment, the method further comprises selecting the image size automatically in dependence upon storage space on the image repository.

In another embodiment, the method further comprises extracting meta-data from the image prior to resizing; resizing the original image to the new resized image; and modifying the extracted meta-data to replace the original image size with the size of the new resized image.

In another embodiment, the method further comprises uploading the modified extracted meta-data to the image repository.

In another embodiment, the method further comprises inserting the modified meta-data into the new resized image; and uploading the new resized image including the modified meta-data to the image repository.

In another aspect of the invention, there is provided a system for resizing an image on a handheld mobile communication device prior to uploading to an image repository, the system comprising an image resizing module adapted to: determine the size of an original image; determine any upload size restrictions for uploading the image to the image repository; and resize the original image to a new resized image to meet the upload size restrictions.

In an embodiment, the image resizing module is further adapted to: specify at least one selectable image size for resizing the original image; receive a user selection of a desired image size; and resize the original image to the user selected desired image size.

In another embodiment, the image resizing module is further adapted to select the image size automatically in dependence upon image upload bandwidth.

In another embodiment, the image resizing module is further adapted to select the image size automatically in dependence upon storage space on the image repository.

In another embodiment, the image resizing module is further adapted to: extract meta-data from the image prior to resizing; resize the original image to the new resized image; and modify the extracted meta-data to replace the original image size with the size of the new resized image.

In another embodiment, the image resizing module is further adapted to prepare the modified extracted meta-data for upload to the image repository.

In another embodiment, the image resizing module is further adapted to: insert the modified meta-data into the new resized image; and prepare the new resized image including the modified meta-data for upload to the image repository.

In another aspect of the invention, there is provide a data processor readable medium containing data processor code that when loaded onto a mobile handheld communication device adapts the device to resize an image prior to uploading the image to an image repository, the data processor readable medium comprising: code for determining the size of an original image; code for determining any upload size restrictions for uploading the image to the image repository; and code for resizing the original image to a new resized image to meet the upload size restrictions in dependence upon the upload size restrictions.

In an embodiment, the data processor medium further comprises: code for specifying at least one selectable image size for resizing the original image; code for receiving a user selection of a desired image size; and code for resizing the original image to the user selected desired image size.

In another embodiment, the data processor readable medium further comprises code for selecting the image size automatically in dependence upon image upload bandwidth.

In another embodiment, the data processor readable medium further comprises code for selecting the image size automatically in dependence upon storage space on the image repository.

In another embodiment, the data processor readable medium further comprises: code for extracting meta-data from the image prior to resizing; code for resizing the original image to the new resized image; and code for modifying the extracted meta-data to replace the original image size with the size of the new resized image.

In another embodiment, the data processor readable medium further comprises code for uploading the modified extracted meta-data to the image repository.

While illustrative embodiments have been described above, it will be appreciated that various changes and modifications may be made. More generally, the scope of the invention is defined by the following claims.

What is claimed is:

1. A method of resizing an image on a handheld mobile communication device prior to transmitting to an online image repository, comprising:
   determining the size of an original image;
   displaying a plurality of sizing options on a display of the handheld mobile communications device, wherein at least two sizing options are each associated with a predetermined image size and wherein each predetermined image size specifies a size of an image after resizing;
   receiving a selection of one of the sizing options;
   extracting meta-data from the image;
   modifying the extracted meta-data to replace the original image size with the size of the resized image in accordance with the selected sizing option;
   resizing the original image in accordance with the selected sizing option to create a resized image; and
   transmitting the resized image to the online image repository.

2. The method of claim 1, further comprising selecting the image size automatically in dependence upon image transmission bandwidth.

3. The method of claim 1, further comprising selecting the image size automatically in dependence upon storage space on the online image repository.

4. The method of claim 1, further comprising transmitting the modified extracted meta-data to the online image repository.

5. The method of claim 1, further comprising:
   inserting the modified meta-data into the resized image; and
   transmitting the resized image including the modified meta-data to the online image repository.

6. A system for resizing an image on a handheld mobile communication device prior to transmitting to an online image repository, the system comprising an image resizing module, executed on a processor, adapted to:
   determine the size of an original image;
   display a plurality of sizing options on a display of the handheld mobile communications device wherein at least two sizing options are each associated with a predetermined image size and wherein each predetermined image size specifies a size of an image after resizing;
   receive a selection of one of the sizing options;
   extract meta-data from the image;
   modify the extracted meta-data to replace the original image size with the size of the resized image in accordance with the selected sizing option;
   resize the original image in accordance with the selected sizing option to create a resized image; and
   transmit the resized image to the online image repository.

7. The system of claim 6, wherein the image resizing module is further adapted to select the image size automatically in dependence upon image transmit bandwidth.

8. The system of claim 6, wherein the image resizing module is further adapted to select the image size automatically in dependence upon storage space on the online image repository.

9. The system of claim 6, wherein the image resizing module is further adapted to prepare the modified extracted meta-data for transmission to the online image repository.

10. The system of claim 6, wherein the image resizing module is further adapted to:
    insert the modified meta-data into the resized image; and
    prepare the resized image including the modified meta-data for transmission to the online image repository.

11. A non-transitory computer readable medium containing computer readable code that when loaded onto a mobile handheld communication device adapts the device to resize an image prior to transmitting the image to an online image repository, the computer readable medium comprising:
    code for determining the size of an original image;
    code for displaying a plurality of sizing options on a display of the handheld mobile communications device, wherein at least two sizing options are each associated with a predetermined image size and wherein each predetermined image size specifies a size of an image after resizing;
    code for receiving a selection of one of the sizing options;
    code for extracting meta-data from the image;
    code for modifying the extracted meta-data to replace the original image size with the size of the resized image in accordance with the selected sizing option;
    code for resizing the original image in accordance with the selected sizing option to create a resized image;

code for transmitting the resized image to the online image repository.

12. The computer readable medium of claim 11, further comprising code for selecting the image size automatically in dependence upon image transmission bandwidth.

13. The computer readable medium of claim 11, further comprising code for selecting the image size automatically in dependence upon storage space on the online image repository.

14. The computer readable medium of claim 11, further comprising code for transmitting the modified extracted meta-data to the online image repository.

15. The method of claim 1, wherein the predetermined image size is specified as a maximum size of any side of the image.

16. The method of claim 1, further comprising: displaying an option to maintain the original image without resizing.

* * * * *